(12) United States Patent
Souza

(10) Patent No.: US 8,700,323 B1
(45) Date of Patent: Apr. 15, 2014

(54) UNDERWATER NAVIGATION SYSTEM

(71) Applicant: John Souza, Medford, OR (US)

(72) Inventor: John Souza, Medford, OR (US)

( * ) Notice: Subject to any disclaimer, the term of this patent is extended or adjusted under 35 U.S.C. 154(b) by 0 days.

(21) Appl. No.: 13/629,435

(22) Filed: Sep. 27, 2012

Related U.S. Application Data

(63) Continuation of application No. 12/630,224, filed on Dec. 3, 2009, now abandoned.

(60) Provisional application No. 61/219,516, filed on Jun. 23, 2009, provisional application No. 61/185,941, filed on Jun. 10, 2009.

(51) Int. Cl.
*G01C 21/12* (2006.01)
*G01C 21/28* (2006.01)

(52) U.S. Cl.
CPC ............... *G10C 21/12* (2013.01); *G01C 21/28* (2013.01)
USPC .............................. 701/494; 701/21; 701/300

(58) Field of Classification Search
CPC ........ G01C 21/12; G01C 21/30; G01C 21/28; G01C 21/20; G05D 1/0272
USPC ........... 701/21, 300, 494, 526, 527, 529, 538, 701/468, 472; 340/988, 990
See application file for complete search history.

(56) References Cited

U.S. PATENT DOCUMENTS

| | | | | |
|---|---|---|---|---|
| 4,037,329 A | * | 7/1977 | Wallace | 34/277 |
| 5,033,818 A | * | 7/1991 | Barr | 359/630 |
| 5,162,828 A | * | 11/1992 | Furness et al. | 353/122 |
| 5,187,871 A | * | 2/1993 | McDermott | 33/354 |
| 6,029,515 A | * | 2/2000 | Lahteenmaki et al. | 73/178 R |
| 6,360,182 B1 | * | 3/2002 | Hales | 702/139 |
| 6,694,911 B1 | * | 2/2004 | Gallagher et al. | 114/315 |
| 6,701,252 B2 | * | 3/2004 | Brown | 701/487 |
| 7,310,063 B1 | * | 12/2007 | Brown | 342/357.57 |
| 7,477,207 B2 | * | 1/2009 | Estep | 345/8 |
| 7,487,043 B2 | * | 2/2009 | Adams | 701/300 |
| 2003/0078706 A1 | * | 4/2003 | Larsen | 701/21 |
| 2007/0006472 A1 | * | 1/2007 | Bauch | 33/355 R |
| 2008/0046139 A1 | * | 2/2008 | Basilico | 701/21 |

FOREIGN PATENT DOCUMENTS

EP        DE 203 15 377 U1  *  5/2004

OTHER PUBLICATIONS

TAMIN, Tamin Navigation System Test, http://mattzz.dyndns.org/wiki/bin/view/Projects/TaminNavigationsSystemTest, Jul. 31, 2004.

* cited by examiner

*Primary Examiner* — Gertrude Arthur Jeanglaude

(74) *Attorney, Agent, or Firm* — Jerry Haynes Law

(57) ABSTRACT

An underwater navigation system for indicating a return direction from an underwater return position to a starting position includes a processor and a power source, a three-dimensional compass, a timer, a water speed sensor and a display interfacing with the processor. The processor is adapted to determine a direction of the starting position relative to the underwater return position based on data received from the three-dimensional compass, the timer and the water speed sensor.

20 Claims, 7 Drawing Sheets

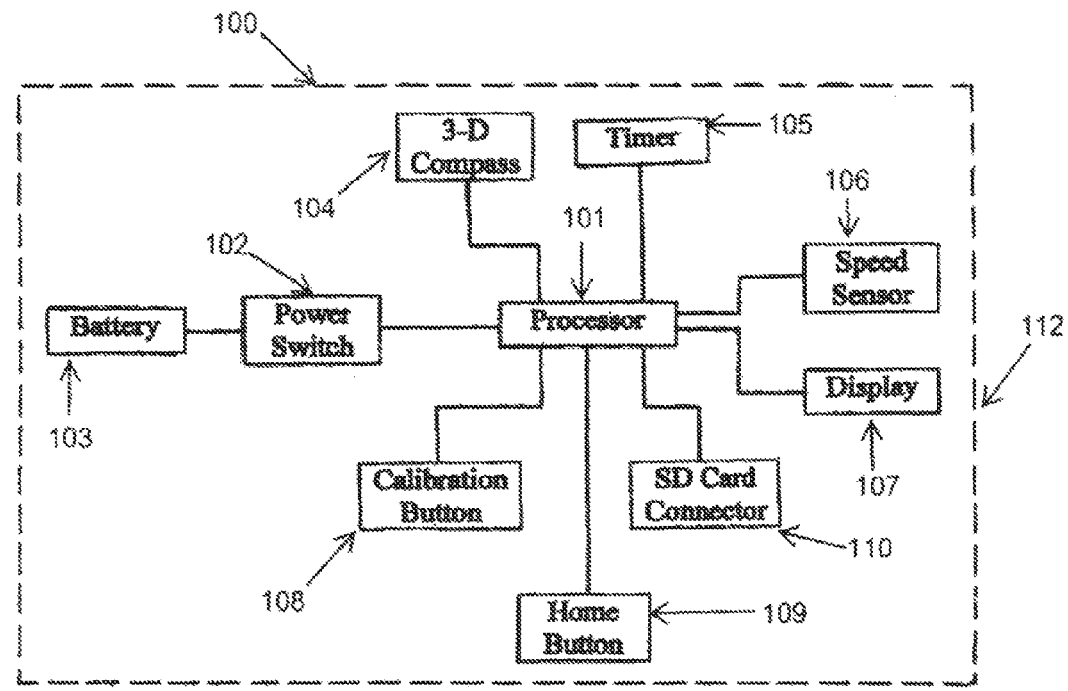
FIG. 1
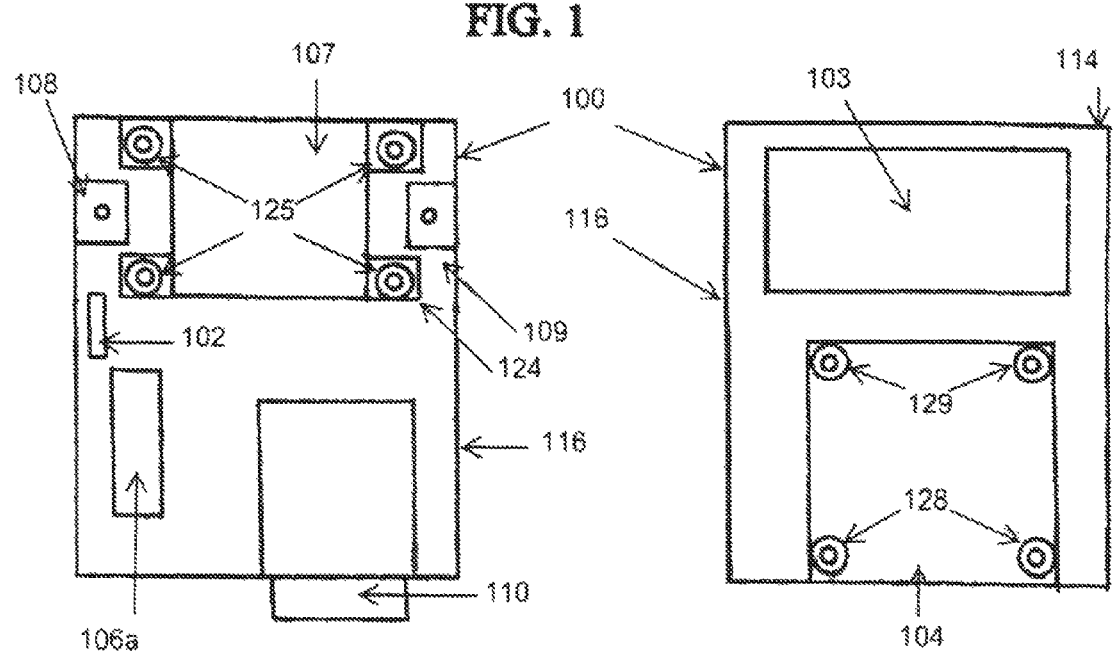
FIG. 2                    FIG. 3

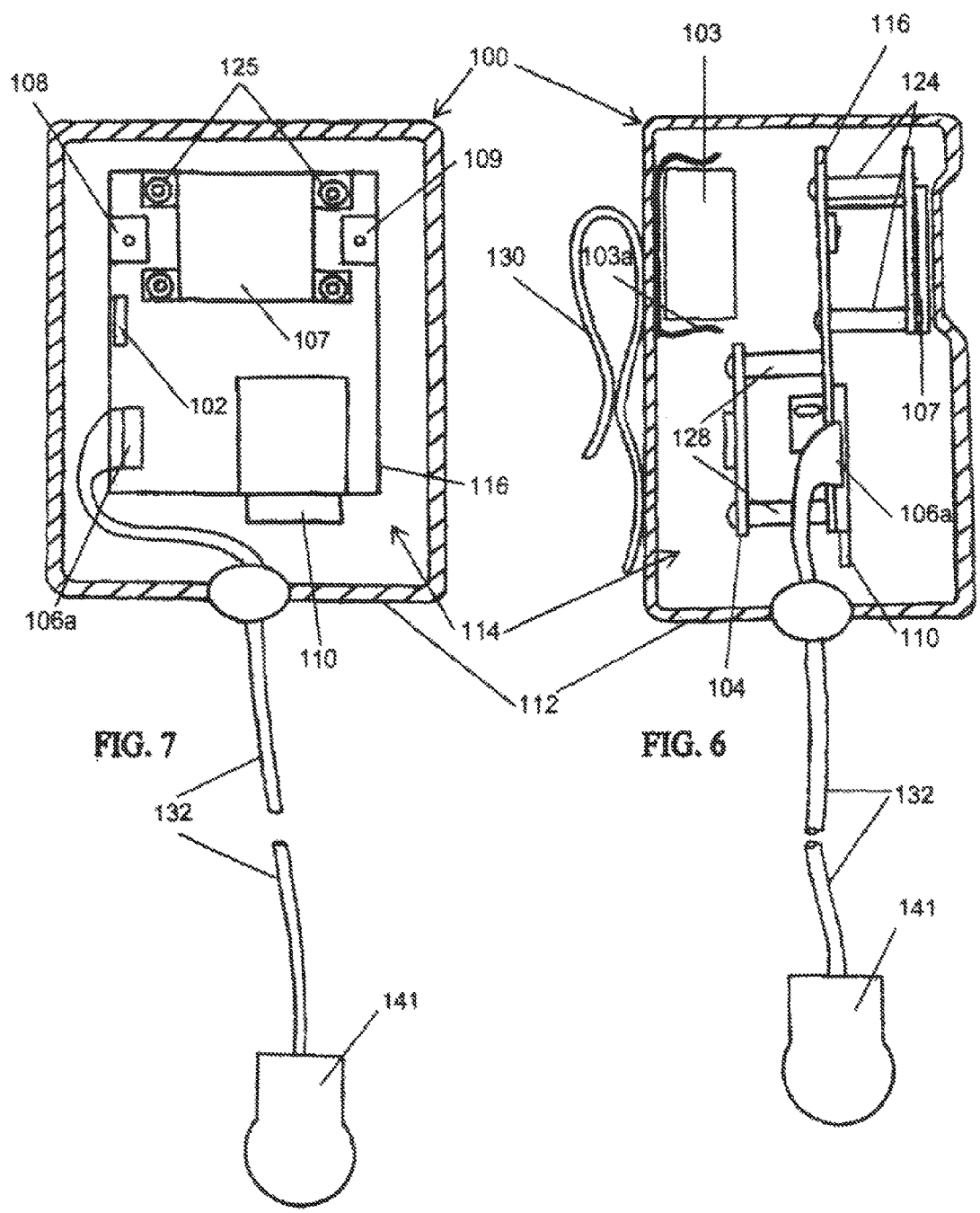

UNDERWATER NAVIGATION SYSTEM

CROSS-REFERENCE TO RELATED APPLICATIONS

This application is a continuation application of U.S. patent application Ser. No. 12/630,224, entitled "Underwater Navigation System", filed Dec. 3, 2009 which claims the benefit of and incorporates by reference in its entirety U.S. Provisional applications No. 61/219,516, filed Jun. 23, 2009 and entitled "Underwater Navigation System" and No. 61/185,941, filed Jun. 10, 2009 and entitled "Underwater Navigation System".

FIELD OF THE INVENTION

The invention relates to underwater navigation systems. More specifically, the invention relates to personal underwater navigations systems used by SCUBA divers and the like that displays the diver's distance, and direction and provides the diver a straight return path back to a starting point.

BACKGROUND OF THE INVENTION

All divers, novice through experienced, face challenges when navigating underwater. Open water diver certification programs include instruction on basic navigation skills for use in dive activities. These programs are generally limited to instruction on how to read a compass underwater and how to swim in a fixed direction for a fixed time and how to return to a start location after reversing the swim direction using readings from the compass. However, these underwater navigation skills are difficult for many divers to master and therefore, a typical diver may never use the skills in diving expeditions.

Even if performed properly, the compass-based underwater navigation technique leaves much to be desired. First, the technique does not take into account underwater currents which can be both strong and invisible and can make it very difficult for a diver to estimate error which is introduced into the diver's navigation path as a result of the currents, much less compensate for the error. Second, it does not account for non-straight line paths which may be either necessary to circumnavigate obstacles or desirable to enjoy viewing features that are off the chosen path in caves and channels, etc.

In addition, it should be noted that even in high visibility areas, a dive boat from which a diver descended into the water may be 60 to 100 feet above the diver and may provide almost no cues to the diver that he or she is directly under the boat unless the diver approaches the surface or encounters and follows a mooring line. A 100-foot dive boat may not even cast a visible shadow when viewed directly from the bottom. This situation is only aggravated by many typical dive sites with less than optimal visibility.

Abandoning use of a compass for underwater navigation can be very disorienting to a diver since many dive sites have silting and low visibility and are mixtures of coral heads, sand beds, and other features which are very similar to each other over a wide area, making landmark recognition and tracking problematic. As a result, it is quite common for even experienced divers to rely on guides who are familiar with a dive site with which the diver is unfamiliar so that the diver can relax and view the surroundings knowing that his or her guide is responsible for safely returning the diver to the boat.

Another indication of the need for an effective device to aid in underwater navigation is the existence of several alternate solutions which have attempted to meet this need. There are several underwater navigation methods that are utilized by commercially-available products. All of these products attempt to address the issues described above but fall short of fully enabling a diver to explore an underwater setting as if the diver were being guided by a human guide. The products typically have limited range from the diver's starting point or from the point on the surface of the water at which the diver begins the dive. In addition, their accuracy and basic functions are commonly compromised for a variety of reasons.

Conventional underwater navigation systems include sonic range finders and GPS-based systems. These systems suffer, however, from several disadvantages in an underwater environment. First, in operation of these systems the diver must remain tethered to the dive boat or other surface component via some sort of signal line or antenna cable. This severely limits travel depth and mobility during a dive. Typical systems implemented with this method use cable lengths of fifty feet or less so that divers using these devices are limited to only relatively shallow dives. In addition, because the diver is tied to a surface line, the freedom that is provided by SCUBA (Self Contained Underwater Breathing Apparatus) is compromised. Mobility to travel through wrecks, coral heads and any features which do not provide a direct line path to the surface becomes problematic. A device which should provide enhanced safety and enjoyment may itself become a safety hazard by increasing the probability that a diver may become entangled by the surface line.

A need therefore remains for an improved personal underwater navigation system provides a diver a straight return path back to a starting point.

SUMMARY OF THE INVENTION

The disclosure is generally directed to an underwater navigation system for indicating a return direction from an underwater return position to a starting position. An illustrative embodiment of the system includes a processor and a power source, a three-dimensional compass, a timer, a water speed sensor and a display interfacing with the processor. The processor is adapted to determine a direction of the starting position relative to the underwater return position based on data received from the three-dimensional compass, the timer and the water speed sensor.

In some embodiments, the system may include a navigation system assembly comprising a printed circuit board; a processor provided on the printed circuit board; and a power source, a three-dimensional compass, a timer, a water speed sensor and a display interfacing with the processor. The processor is adapted to determine a direction of the starting position relative to the underwater return position based on data received from the three-dimensional compass, the timer and the water speed sensor. A waterproof system housing may enclose the navigation system assembly. The system may also include wireless technology to enable the speed sensor and compass to be attached to a diver or the diver's gear in a different location than the LCD screen thus sending data to a wrist unit.

The disclosure is further generally directed to an underwater navigation method. An illustrative embodiment of the method includes providing a diver starting position, having a diver swim away from the diver starting position, monitoring a diver swim speed of the diver, monitoring a three-dimensional swim direction of the diver away from the diver starting position, monitoring a diver swim time, having the diver arrive at a diver return position, determining a diver return direction required for the diver to return to the diver starting position from the diver return position using the diver swim speed, the three-dimensional swim direction and the diver swim time and indicating the diver return direction.

BRIEF DESCRIPTION OF THE DRAWINGS

The disclosure will now be made, by way of example, with reference to the accompanying drawings, in which:

FIG. 1 is a schematic block diagram of an illustrative embodiment of the underwater navigation system;

FIG. 2 is a top view of a navigation system assembly of an illustrative embodiment of the underwater navigation system;

FIG. 3 is a bottom view of the navigation system assembly;

FIG. 6 is a side view, partially in section, of an illustrative embodiment of the underwater navigation system, with the navigation system assembly provided in a housing (shown in section) and a speed sensor attached to the assembly by a speed sensor cable;

FIG. 7 is a top view, partially in section, of the underwater navigation system illustrated in FIG. 6;

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration". Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 12:
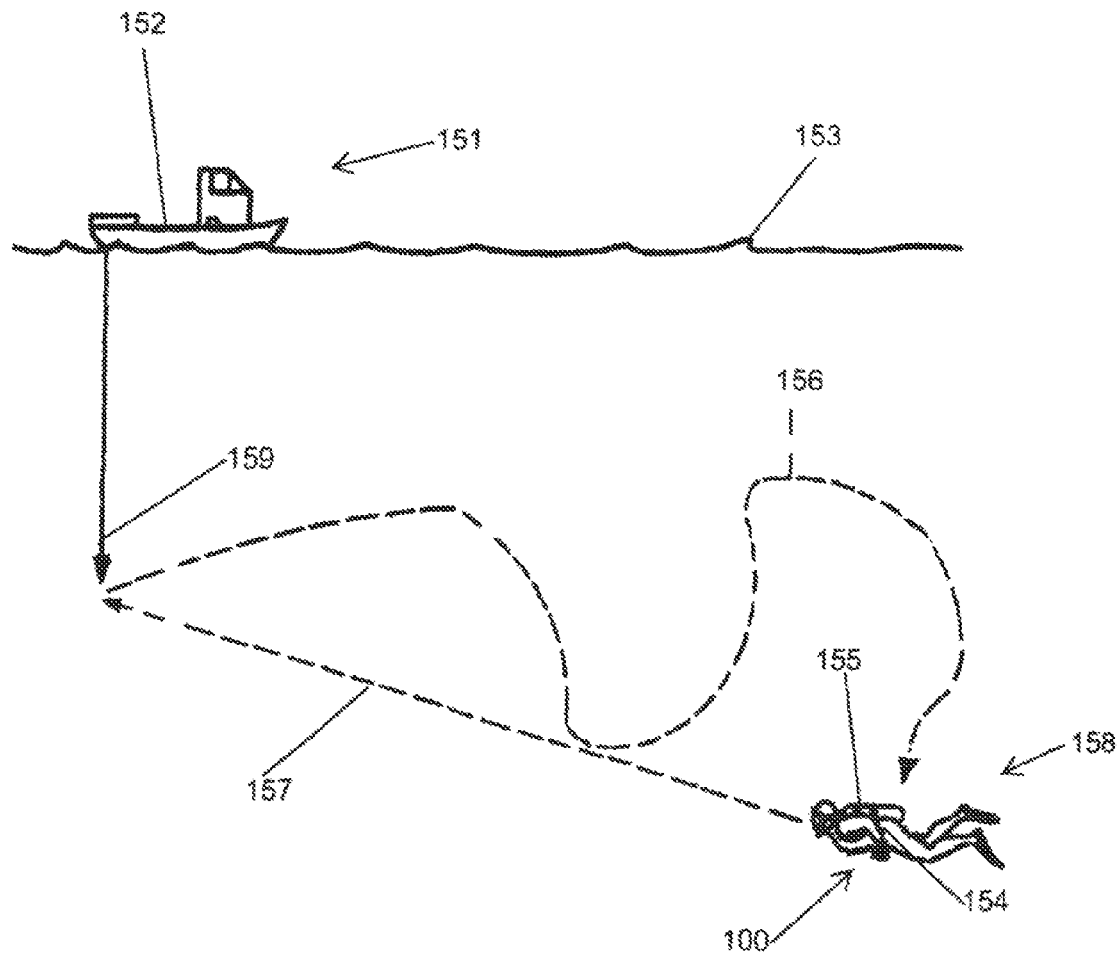
FIG. 12 is a diagram which illustrates return of a diver to a starting point in a water body in implementation of an illustrative embodiment of the underwater navigation system.

Referring initially to FIGS. 1 and 12 of the drawings, an illustrative embodiment of the underwater navigation system, hereinafter system, is generally indicated by reference numeral 100. As illustrated in FIG. 12 and will be hereinafter described, the system 100 is adapted for attachment to a diver 154 (FIG. 12) and monitors the diving speed, time and three-dimensional compass coordinates of the diver 154 relative to a dive boat 152 or other starting position 151 in or on a water body 153 as the diver 154 swims away from the starting position 151 along a diving path 156 to a return position 158. The diving path 156 may originate at an anchor 159 which is dropped beneath the dive boat 152. At the return position 158, the system 100 indicates the diver's return direction, or direction in which the diver 154 must swim to return to the starting position 151, and enables the diver 154 to return to the starting position 151 typically along a straight line return path 157. The system 100 may be fastened to the wrist of the diver 154, as illustrated in FIG. 12, or alternatively, may be fastened to a tank 155 or other equipment which is worn by the diver 154.

As illustrated in FIG. 1, the system 100 may include a waterproof system housing 112 which contains the components of the system 100. The system 100 may include a processor 101. A battery 103 may be electrically connected to the processor 101 through a power switch 102. A three-dimensional compass 104 may interface with the processor 101. The three-dimensional compass 104 may be any type of device which is capable of mapping the north, south, east and west coordinates of the diver 154 (FIG. 12) and the depth of the diver beneath the surface of the water body 153 as the diver 154 dives or swims along the diving path 156 in the water body 153. In some embodiments, the three-dimensional compass 104 may be a PNI TCM 5 tilt compensated 3-axis compass module which is available from Tri-M Systems Inc. (www.tri-m.com), for example and without limitation. A timer 105, a water speed sensor 106 and a display 107 may each interface with the processor 101. The timer 105 is adapted to monitor the dive time which elapses as the diver 154 travels from the starting position 151 to the return position 158 in the water body 153. The water speed sensor 106 may be any type of device which is capable of measuring the diving speed of the diver 154 as the diver 154 dives along the diving path 156 in the water body 153. An exemplary water speed sensor 106 which is suitable for the purpose will be hereinafter described. A calibration button 108 and a home button 109 may interface with the processor 101. In some embodiments, an SD card connector 110 may additionally interface with the processor 101 to facilitate transfer of data between an SD card (not illustrated) inserted in the SD card connector 110 and the processor 101.

The calibration button 108 is adapted to be depressed as the diver 154 swims away from the starting position 151 and calibrates the system 100 to the diving speed of the diver 154 as the diver 154 swims along the diving path 156. The home button 109 is adapted to be depressed by the diver 154 when the diver 154 desires to return to the starting position 151 from the return position 158. Accordingly, the home button 109 when depressed initiates a triangulation process in which the processor 101 utilizes the compass coordinate data received from the three-dimensional compass 104, the dive time data received from the timer 105 and the diving speed data received from the water speed sensor 106 to determine the direction at which the starting position 151 is located relative to the return position 158 of the diver 154. The processor 101 with supporting software may be adapted to display one or multiple arrows on the display 107 which indicate(s) the direction of the starting position 151 relative to the return position 158 of the diver 154.

Figure 4:
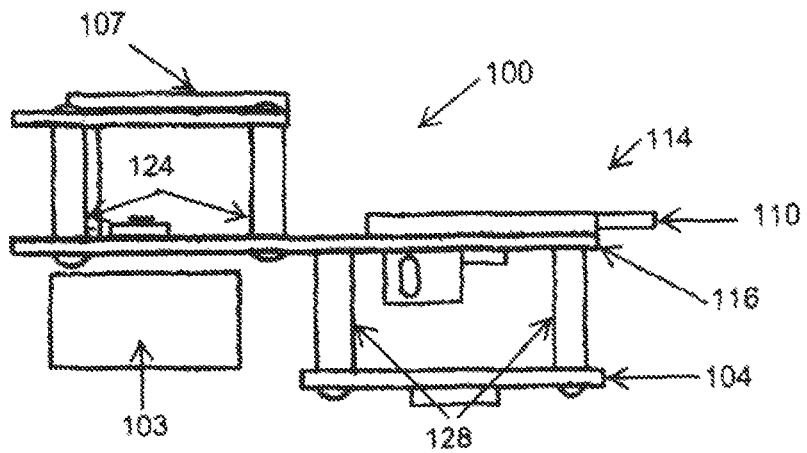
FIG. 4 is a side view of the navigation system assembly.

Referring next to FIGS. 2-4, in some embodiments the system 100 may include a navigation system assembly, hereinafter assembly 114. The assembly 114 may include a PCB (printed circuit board) 116 on which is provided the various electronic components of the system 100. Multiple display supports 124 may extend from a first surface of the PCB 116. The display 107 may be provided on the display supports 124 in spaced-apart relationship with respect to the PCB 116. Multiple compass supports 128 may extend from a second surface of the PCB 116. The three-dimensional compass 104 may be provided on the compass supports 128. As shown in FIG. 2, a speed sensor connector 106a may additionally be provided on the PCB 116. The speed sensor 106 may be adapted for connection to the speed sensor connector 106a typically in a manner which will be hereinafter described.

Referring next to FIGS. 6 and 7 of the drawings, the assembly 114 of the system 100 may be provided in the watertight system housing 112. The water speed sensor 106 may include a speed sensor assembly 141 which is connected to the speed sensor connector 106a provided on the PCB 116 through a speed sensor cable 132. The speed sensor cable 132 may extend through a cable grommet 133 which is provided in the system housing 112. In some embodiments, a battery clip 103a may be provided on an interior surface of the system housing 112. The battery 103 of the system 100 may be detachably secured in the battery clip 103a. As further illustrated in FIG. 6, an attachment clip 130 may be provided on the exterior surface of the system housing 112 to facilitate attachment of the system 100 to the diver 154 (FIG. 12).

Figure 8:
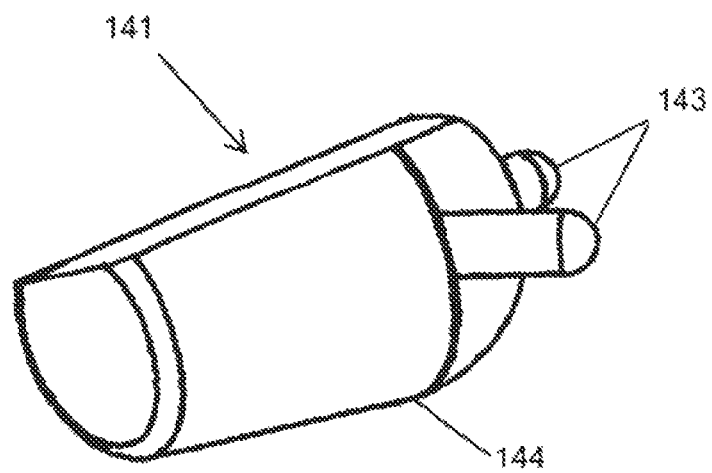
FIG. 8 is a rear perspective view of an illustrative speed sensor assembly which is suitable for implementation of the speed sensor.
Figure 9:
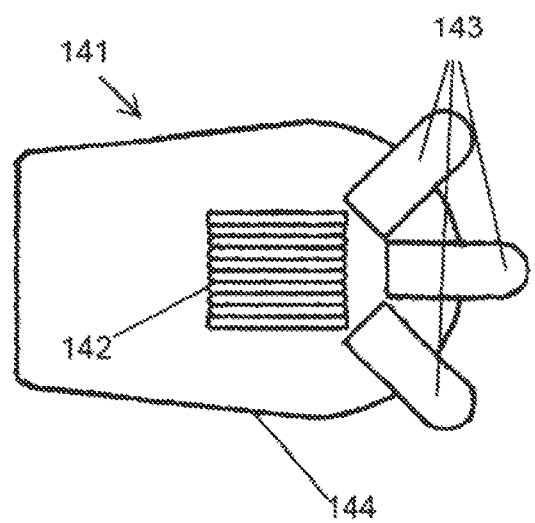
FIG. 9 is a longitudinal sectional view of the speed sensor assembly.
Figure 10:
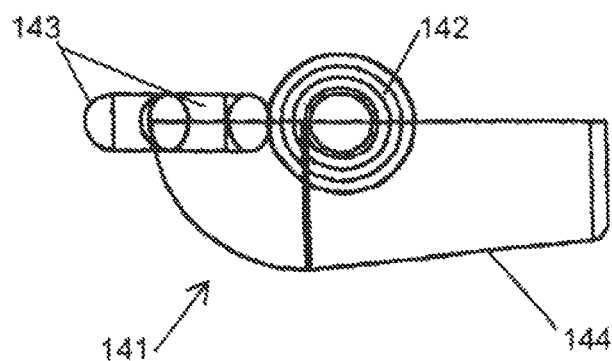
FIG. 10 is a side view, partially in section, of the speed sensor assembly.
Figure 11:
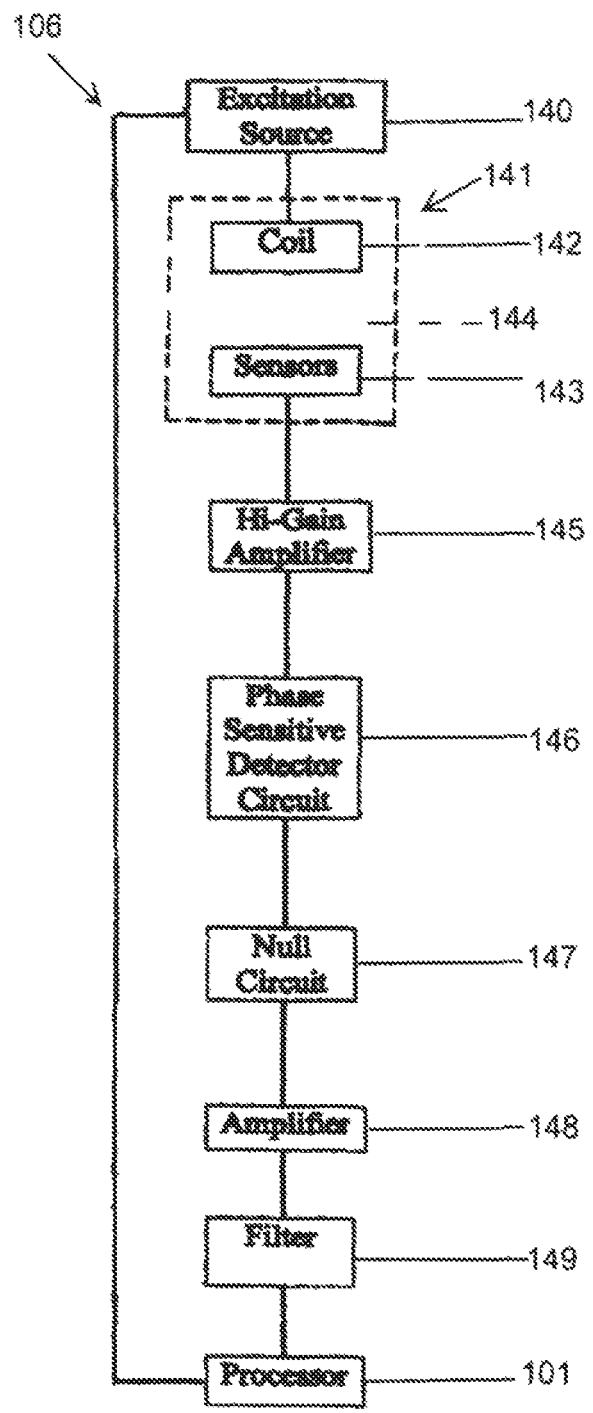
FIG. 11 is a schematic block diagram of an illustrative speed sensor which is suitable for implementation of an illustrative embodiment of the underwater navigation system.

Referring next to FIGS. 8-11, the speed sensor assembly 141 of the water speed sensor 106 may include an assembly housing 144 as illustrated in FIGS. 8-10. A magnetic coil 142 may be provided in the assembly housing 144. Multiple, spaced-apart sensors 143 may be provided in the assembly housing 144 in spaced-apart relationship with respect to each other and may protrude from the assembly housing 144. As illustrated in FIG. 11, the water speed sensor 106 may further include an excitation source 140 which may be connected to the battery 103 (FIG. 1) through the processor 101. The coil 142 of the speed sensor assembly 141 may be connected to the excitation source 140. A high-gain amplifier 145, a phase sensitive detector circuit 146, a null circuit 147, an amplifier 148 and a filter 149 may be connected in series to the sensors 143. The processor 101 of the system 100 may be connected to the filter 149.

In application of the system 100, which will be hereinafter described, the water speed sensor 106 senses the swim speed of the diver 154 (FIG. 12) in the water body 153 based on the physics of Faraday's Law, which states that the flow of a conductive fluid in a magnetic field results in the development of an electric potential. Accordingly, the excitation source 140 (FIG. 11) induces ac excitation of the coil 142 such that the voltage of current which flows through the coil 142 is ac in nature. The coil 142 generates an electromagnetic field outside the assembly housing 144. The sensors 143 measure the electric potential which results in the water body 153 outside the assembly housing 144. Accordingly, as the speed sensor assembly 141 moves through the water body 153, the ac potential which is sensed by the sensors 143 changes according to the swim speed of the diver 154 and is monitored by the high-gain amplifier 145. The high-gain amplifier 145 and the phase sensitive detector circuit 146 receive the current from the sensors 143 and produce a DC voltage that is directly proportional to the swim speed of the diver 154 through the water body 153 and represents the flow velocity of the water in the water body 153 at the sensors 143. The null circuit 147, the amplifier 148 and the filter 149 produce a usable electrical signal that is scaled for interfacing with the speed-measuring capabilities of the processor 101.

Referring again to FIG. 12, in operation the system 100 is initially attached to the diver 154 such as to the wrist (not labeled) or alternatively, to equipment such as a tank 155 which is worn by the diver 154. In some applications, the system 100 may be attached to the diver 154 or to the equipment worn by the diver 154 using the attachment clip 130 (FIG. 6) provided on the exterior of the system housing 112. In other applications, the system 100 may be manually held by the diver 154. The diver 154 may enter the water body 153 from a dive boat 152 at a starting point 151 for the dive. In some applications, the starting point 151 may be a coral reef, land bank or other structure or may be a location beneath the surface of the water body 153. The speed sensor 106 may extend from the system housing 112 and trail into the water body 153. As he or she begins to swim along the diving path 156 in the water body 153, the diver 154 calibrates the system 100 to the speed of the diver 154 (typically about 3~5 seconds) by depression of the calibration button 108. The processor 101 of the system 100 may display a "start dive" mode indication on the display 107. As the diver 154 swims along the diving path 156, the three-dimensional compass 104 monitors the compass coordinates and depth of the diver 154; the timer 105 monitors the time which elapses during the diver's swim; and the water speed sensor 106 monitors the speed of the diver 154 in the water body 153.

When the diver 154 reaches the return position 158 in the water body 153 and desires to return to the starting position 151, he or she depresses the home button 109 of the system 100, 100a. Accordingly, the processor 101 initiates a triangulation process in which the processor 101 utilizes the compass coordinates received from the three-dimensional compass 104, the dive time received from the timer 105 and the water speed information received from the water speed sensor 106 to determine the diver's return direction, or the direction at which the starting position 151 is located relative to the return position 158 of the diver 154. The processor 101 then displays one or multiple arrows on the display 107 which indicate(s) the direction of the starting position 151 relative to the return position 158 of the diver 154. The diver 154 then follows the direction which is indicated by the arrow or arrows to swim back to the starting position 151 typically in a straight line along the return path 157. The system 100 provides the diver 154 a safe way of return to the dive boat 152 or other starting position 151 typically via the straight return path 157.

Figure 5:
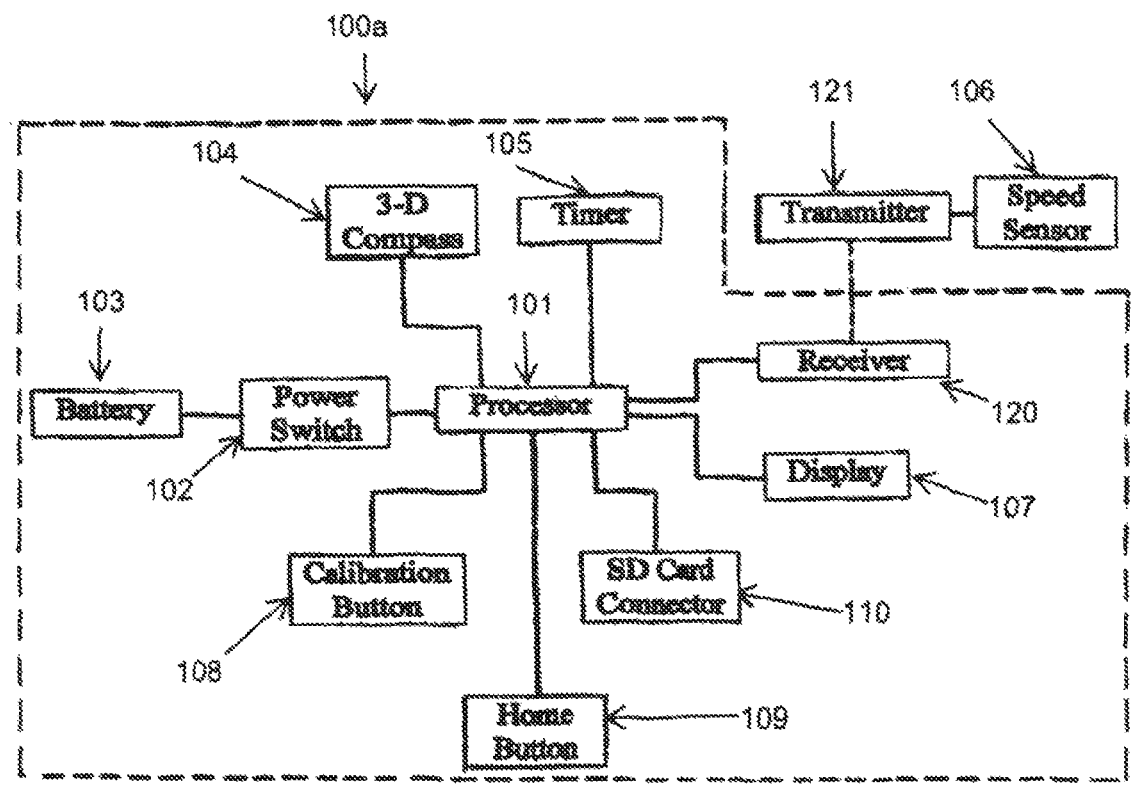
FIG. 5 is a block diagram of an alternative illustrative embodiment of the underwater navigation system.

Referring next to FIG. 5 of the drawings, an alternative illustrative embodiment of the underwater navigation system is generally indicated by reference numeral 100a. The system 100a may have a design which is similar to that of the system 100 which was heretofore described with respect to FIG. 1. In the system 100a, a receiver 120 may be connected to the processor 101. The speed sensor 106 may be connected to a transmitter 121. The transmitter 121 is adapted to transmit transmission signals 122 which indicate the speed of the diver 154 as measured by the water speed sensor 106 as the diver 154 moves through the water body 153 and are received by the receiver 120. Accordingly, the speed sensor 106 and the transmitter 121 may be attached to a portion on the diver 154 which is remote from the rest of the system 100a. In some applications, the speed sensor 106 and the transmitter 121 may be attached to a tank 155 and the rest of the system 100a may be attached to the wrist of the diver 154, for example and without limitation.

Figure 13:
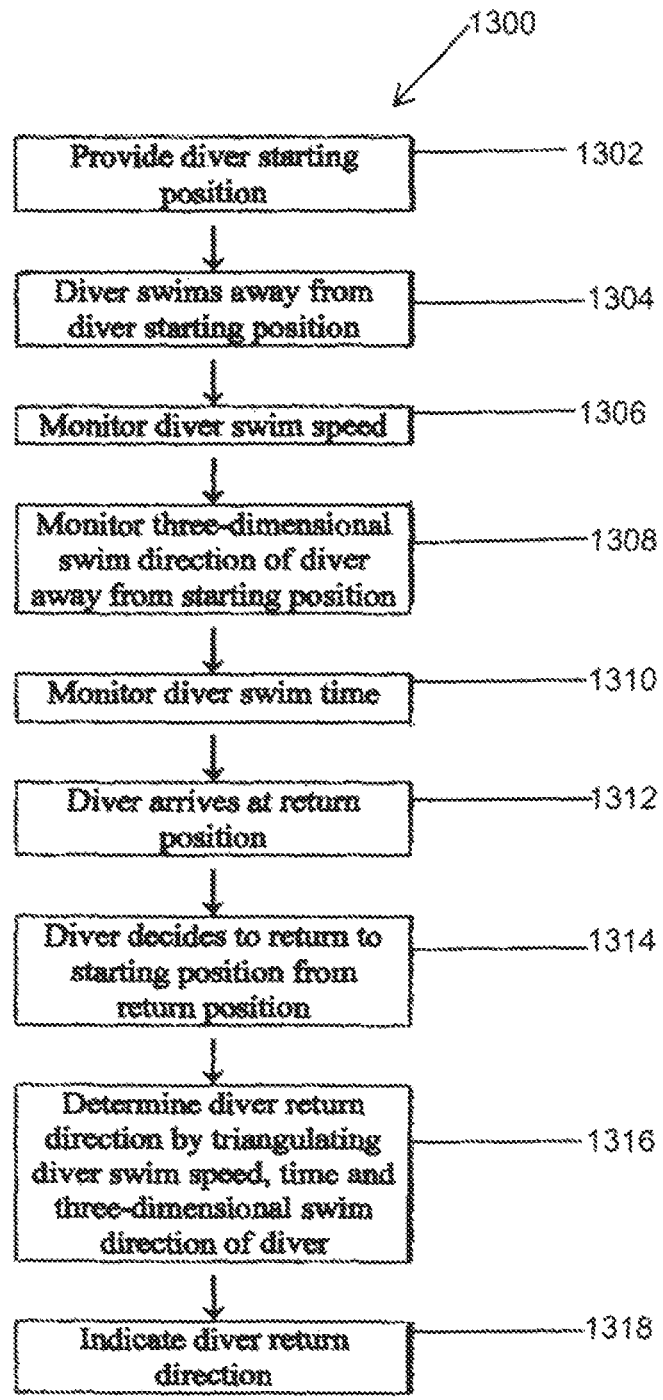
FIG. 13 is a flow diagram of an illustrative embodiment of an underwater navigation method.

Referring next to FIG. 13 of the drawings, an illustrative embodiment of an underwater navigation method is generally indicated by reference numeral 1300. In block 1302, a diver starting position in or on the surface of a water body is provided. In block 1304, a diver swims away from the diver starting position. In block 1306, the swim speed of the diver is monitored. In block 1308, the three-dimensional swim direction (compass coordinates and water depth) of the diver away from the starting position is monitored. In block 1310, the swim time of the diver is monitored. In 1312, the diver arrives at a return position. In block 1314, the diver decides to return to the starting position from the return position. In block 1316, the diver's return direction is triangulated using the diver swim speed, time and three-dimensional swim direction of the diver. In block 1318, the diver's return direction is indicated to the diver.

While the preferred embodiments of the disclosure have been described above, it will be recognized and understood that various modifications can be made in the disclosure and the appended claims are intended to cover all such modifications which may fall within the spirit and scope of the disclosure.

What is claimed is:

1. An underwater navigation system for indicating a return direction from an underwater return position to a starting position, comprising:
   a processor;
   a power source interfacing with the processor;
   a three-dimensional compass interfacing with the processor;
   a timer interfacing with the processor;
   a water speed sensor interfacing with the processor;
   a display interfacing with the processor; and
   wherein the processor is adapted to determine a direction of the starting position relative to the underwater return position based on data received from the three-dimensional compass, the timer and the water speed sensor.

2. The system of claim 1 further comprising a calibration button interfacing with the processor.

3. The system of claim 1 further comprising a home button interfacing with the processor and adapted to cause the processor to determine the direction of the starting position relative to the underwater return position.

4. The system of claim 1 further comprising an SD card connector interfacing with the processor.

5. The system of claim 1 wherein said speed sensor comprises a speed sensor assembly and a speed sensor cable connecting the speed sensor assembly to the processor.

6. The system of claim 5 wherein said speed sensor assembly comprises an assembly housing, a magnetic coil provided in the assembly housing and connected to the processor and a plurality of sensors provided in the assembly housing and connected to the processor.

7. The system of claim 6 further comprising an excitation source connected to the processor and wherein the magnetic coil is connected to the excitation source.

8. The system of claim 7 further comprising a high-gain amplifier connected to the plurality of sensors, a phase sensitive detector circuit connected to the high-gain amplifier, a null circuit connected to the phase sensitive detector circuit, an amplifier connected to the null circuit and a filter connected to the amplifier and the processor.

9. An underwater navigation system for indicating a return direction from an underwater return position to a starting position, comprising:
   a navigation system assembly comprising:
      a printed circuit board;
      a processor provided on the printed circuit board;
      a power source interfacing with the processor;
      a three-dimensional compass interfacing with the processor;
      a timer interfacing with the processor;
      a water speed sensor interfacing with the processor;
      a display interfacing with the processor; and
      wherein the processor is adapted to determine a direction of the starting position relative to the underwater return position based on data received from the three-dimensional compass, the timer and the water speed sensor; and
   a waterproof system housing enclosing the navigation system assembly.

10. The system of claim 9 further comprising a plurality of display supports extending from the printed circuit board and wherein the display is carried by the display supports.

11. The system of claim 9 further comprising a plurality of compass supports extending from the printed circuit board and wherein the three-dimensional compass is carried by the compass supports.

12. The system of claim 9 further comprising an attachment clip provided on an exterior surface of the system housing.

13. The system of claim 9 further comprising a calibration button interfacing with the processor.

14. The system of claim 9 further comprising a home button interfacing with the processor and adapted to cause the processor to determine the direction of the starting position relative to the underwater return position.

15. The system of claim 9 further comprising an SD card connector interfacing with the processor.

16. The system of claim 9 further comprising a receiver interfacing with the processor and a transmitter interfacing with the speed sensor and adapted to transmit transmission signals to the receiver.

17. An underwater navigation method, comprising:
   providing a diver starting position;
   having a diver swim away from the diver starting position;
   monitoring a diver swim speed of the diver;
   monitoring a three-dimensional swim direction of the diver away from the diver starting position;
   monitoring a diver swim time;
   having the diver arrive at a diver return position;
   determining a diver return direction required for the diver to return to the diver starting position from the diver return position using the diver swim speed, the three-dimensional swim direction and the diver swim time; and
   indicating the diver return direction.

18. The method of claim 17 wherein providing a diver starting position comprises providing a dive boat.

19. The method of claim 17 wherein indicating a diver return direction comprises providing a display and indicating the swim direction by providing at least one arrow on the display.

20. The method of claim 17 further comprising having the diver swim from the diver return position to the diver starting position along a substantially straight return path.

* * * * *